United States Patent [19]

Taketsugu et al.

[11] Patent Number: 5,420,863
[45] Date of Patent: May 30, 1995

[54] MOBILE COMMUNICATION SYSTEM WITH CELL-SITE SWITCHING FOR INTRA-CELL HANDOFF

[75] Inventors: Masanori Taketsugu; Yukitsuna Furuya, both of Tokyo, Japan

[73] Assignee: NEC Corporation, Tokyo, Japan

[21] Appl. No.: 87,887

[22] Filed: Jul. 9, 1993

[30] Foreign Application Priority Data

Jul. 9, 1992 [JP] Japan .................................. 4-181405
Jul. 10, 1992 [JP] Japan .................................. 4-183269

[51] Int. Cl.[6] .............................................. H04J 3/16
[52] U.S. Cl. .................................. 370/95.3; 379/60; 455/33.1; 455/34.1
[58] Field of Search ............... 455/33.1, 33.3, 34.1, 455/34.2, 54.1, 54.2, 56.1; 379/60, 59, 63; 370/95.1, 95.3, 94.1, 92

[56] References Cited

U.S. PATENT DOCUMENTS

| | | | |
|---|---|---|---|
| 4,674,084 | 6/1987 | Suzuki et al. | 370/92 |
| 4,956,839 | 9/1990 | Torrio et al. | 370/94.1 |
| 5,081,679 | 1/1992 | Dent | 379/60 |
| 5,101,501 | 3/1992 | Gilhousen et al. | 455/34.1 |
| 5,121,391 | 6/1992 | Paneth et al. | 370/95.1 |
| 5,230,082 | 7/1993 | Ghisler et al. | 455/33.2 |
| 5,267,261 | 11/1993 | Blakeney, II et al. | 455/33.1 |

FOREIGN PATENT DOCUMENTS 0151281 8/1985 European Pat. Off. .
WO8805981 8/1988 WIPO .

OTHER PUBLICATIONS

European Search Report No. EP 93111040.7.
Fumiaki Ishino et al., "Mobile Communication Switching System For voice/Nonvoice Services", IEEE Globe Com '91, pp. 1485–1489.

Primary Examiner—Douglas W. Olms
Assistant Examiner—Shick Hom
Attorney, Agent, or Firm—Sughrue, Mion, Zinn, Macpeak & Seas

[57] ABSTRACT

In a TDMA cellular mobile communication system, incoming signals from the public switched network are converted by speech coder/data compressor units of a MTSO (mobile telephone switching office) to low-bit-rate signals and combined into a first TDM signal for transmission to a base station. The components of the first TDM signal are respectively routed according to a channel assignment signal and fed into desired modulators which are periodically activated according to the channel assignment signal to transmit signals on assigned channels to mobile units. Signals from the mobile units are received by demodulators at the base station and combined into a second TDM signal which is transmitted to the MTSO. The components of the second TDM signal are routed according to the channel assignment signal to appropriate speech decoder/data expander units for conversion to the original high-bit-rate signals for transmission to the network.

15 Claims, 11 Drawing Sheets

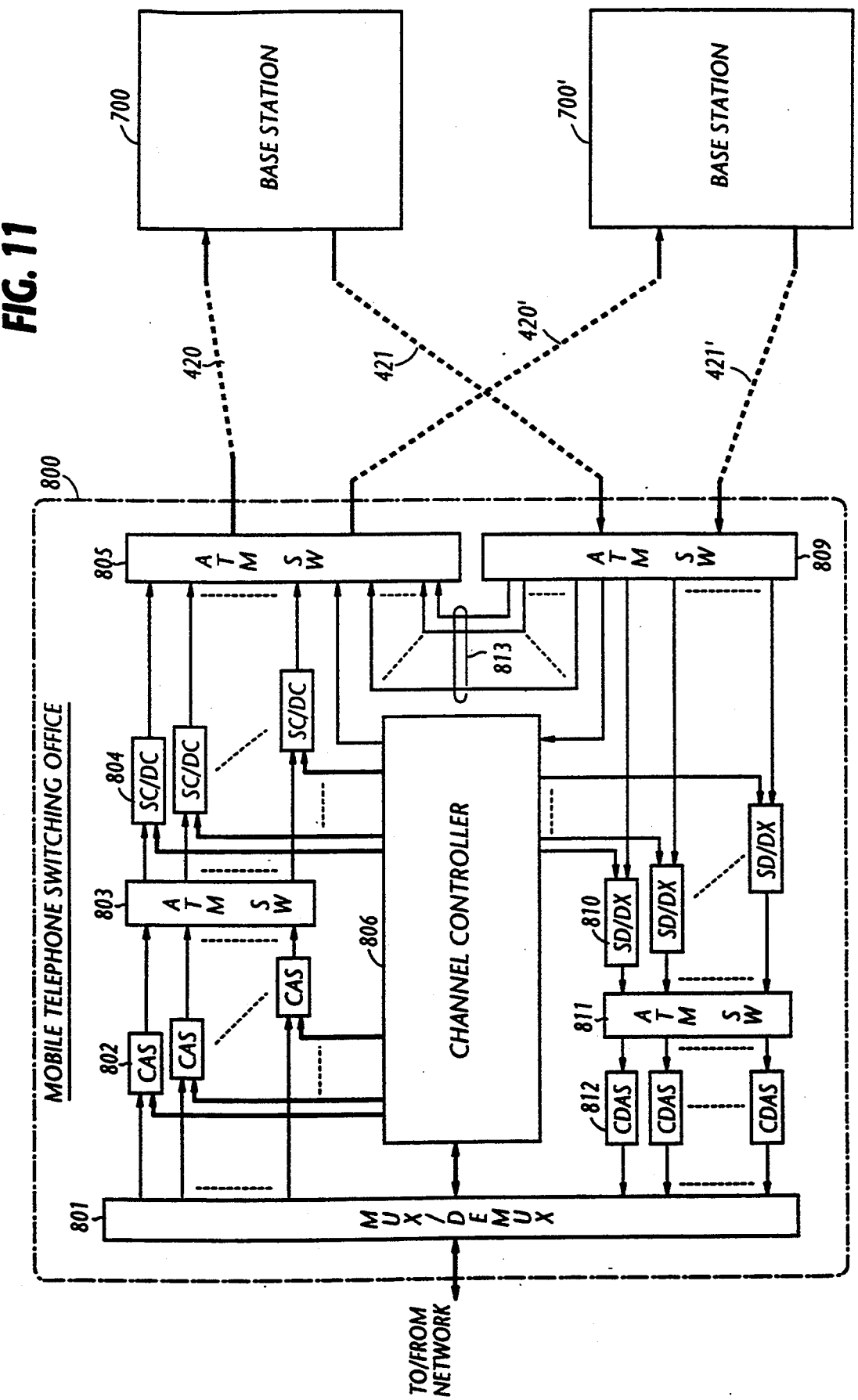

MOBILE COMMUNICATION SYSTEM WITH CELL-SITE SWITCHING FOR INTRA-CELL HANDOFF

BACKGROUND OF THE INVENTION

1. Field of the Invention

The present invention relates to a TDMA (time division multiple access) cellular mobile communication system, and more specifically to a handoff technique that is used for switching channels during communication.

2. Description of the Related Art

In a cellular mobile communication system, particularly in a digital system where the channel frequencies assigned to cell sites are considerably high and interference between adjacent cells occurs frequently even though the mobile unit remains stationary. Since the interference varies with different location of the mobile unit, the quality of the channel being in use constantly varies with the movement of the mobile unit. It is thus necessary to perform switching of channels even if the mobile unit does not cross the boundary between cells. This channel switching is known as "intra-cell handoff" in contrast with "inter-cell handoff" in which the channel switching takes place between adjacent cell sites when the mobile unit is moving across a cell border.

A known TDMA cellular system, as described in a paper "Mobile Communication Switching System for Voice/Nonvoice Services", IEEE GLOBE COM '91, pages 1485-1489, Ishino et al, employs a plurality of speech coder/decoder units at the mobile telephone switching office (MTSO) for lowering the bit rate of signals to increase the capacity of the system. A plurality of modulator/demodulator units are installed in the base station and connected via duplicated 64-kps circuits to the speech coder/decoder units in a one-to-one correspondence. The speech coder/decoder units are connected to terminals of a MTSO switch where switched connections are established with the public switched telephone network. Line-cost reduction is achieved by time-division multiplexing three speech signals at each end of the transmission link.

Since the speech coder/decoder units at the MTSO are associated in a one-to-one correspondence with the modulator/demodulator units at the base station, there is a need to provide switchover between speech coder/decoder units during handoff, in addition to switchover between modulator/demodulator units. Additionally, due to the inherent difficulty in precisely matching the switchover instant at the MTSO with the switchover instant at the base station, a three-way trunk circuit is provided to ensure against possible interruption of connection.

SUMMARY OF THE INVENTION

It is therefore an object of the present invention to provide a TDMA cellular mobile communication system which ensures uninterrupted handoff without using three-way trunk circuits.

Another object of this invention is to provide a TDMA cellular mobile communication system which establishes a loopback circuit to avoid the use of speech coder/decoder units at the MTSO when a call is established between mobile units in the same cell zone.

According to the present invention, there is provided a TDMA cellular mobile communication system having a mobile switching system connected to a communications network and at least one base station connected to the mobile switching system. The mobile switching system comprises a plurality of first conversion circuits (speech codec/data compander unit) for providing bit-rate conversion of signals from the network from a high bit rate to a low bit rate. The bit-rate converted signals are combined into a first TDM signal (MTSO-to-BS). A first switch receives a second TDM signal (BS-to-MTSO) from the base station and routes the signal components of the second TDM signal to the outlets of the switch according to a channel assignment signal. A plurality of second conversion circuits are connected to the outlets of the first switch for providing bit-rate conversion of the TDM component signals routed by the first switch from the low bit rate to the high bit rate. The base station comprises a second switch for receiving the first TDM signal from the mobile switching system and routing its component signals to the outlets of the switch according to the channel assignment signal. Modulators are connected to the outlets of the second switch. Each modulator defines a time slot on a unique frequency according to the channel assignment signal and transmits a component of the first TDM signal routed by the second switch. Signals are received by a plurality of demodulators on the defined time slots. The second TDM signal is derived from the outputs of the demodulators and applied to the first switch.

BRIEF DESCRIPTION OF THE DRAWINGS

The present invention will be described in further detail with reference to the accompanying drawings, in which:

FIG. 11 is a block diagram of a further modification of the embodiment of FIG. 9.

DETAILED DESCRIPTION

Figure 1:
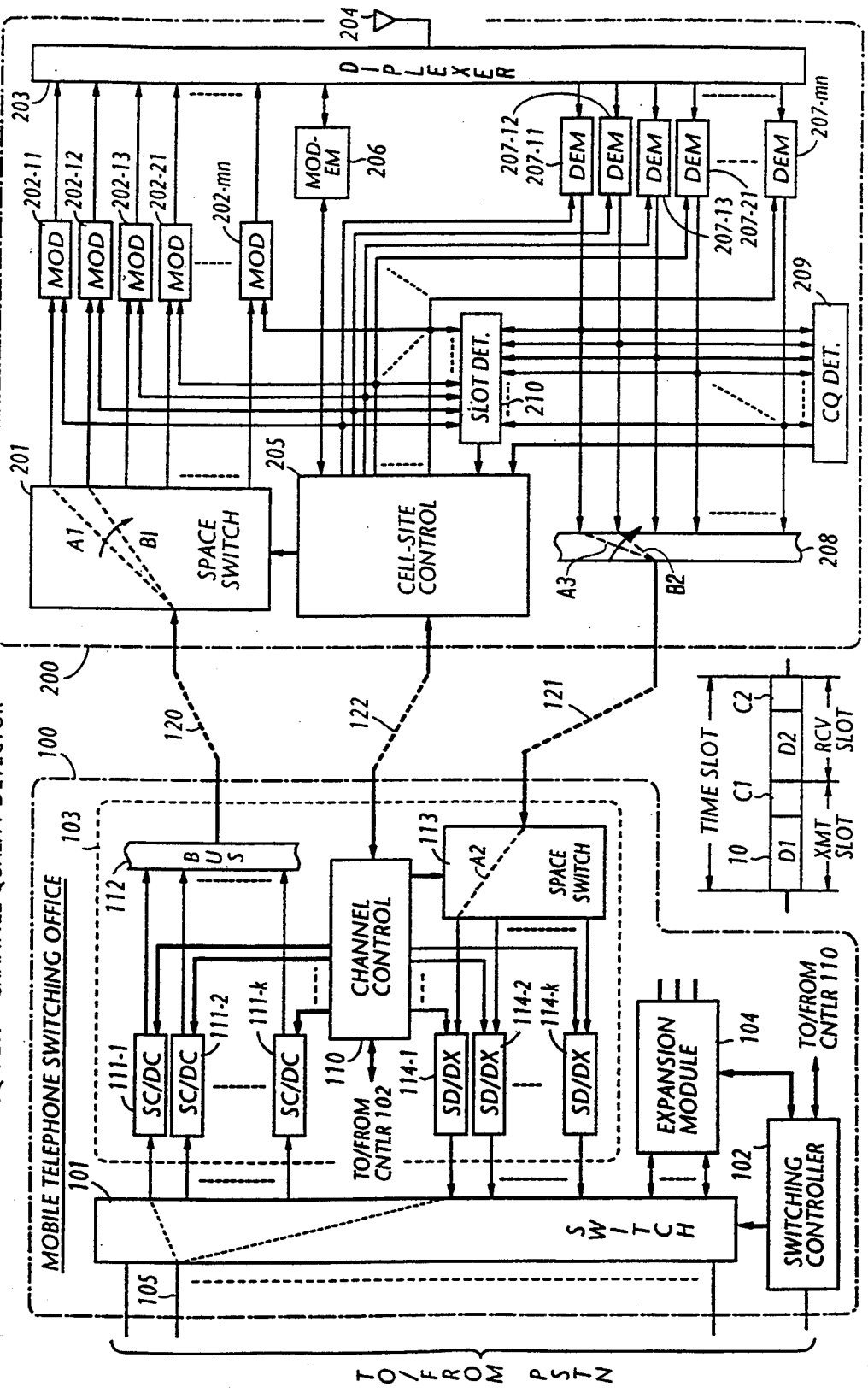
FIG. 1 is a block diagram of a TDMA cellular mobile communication system according to one embodiment of the present invention.

Referring now to FIG. 1, there is shown a TDMA cellular mobile communication system according to a first embodiment of the present invention, The system includes a mobile telephone switching office (MTSO)

100 which is connected to or forms part of the public switched telephone network (PSTN). The MTSO 100 includes a switch 101 controlled by a switching controller 102, and a network termination module 103 which is provided in a one-to-one correspondence to a base station 200 and serves as a network-side controller of the system. Module 103 includes a channel controller 110 which performs overall control of the module 103, a plurality of speech encoder/data compressor (SC/DC) units 111-1~111-k whose outputs are combined by a bus 112. Channel controller 110 controls the transmit timing of SC/DC units 111-1~111-k so that their outputs are multiplexed into a TDM signal at the bus 112 for transmission through a high-speed transmission line 120 to the base station 200. An incoming TDM signal from the base station via a high-speed transmission line 121 is terminated to the inlet of a space switch 113 having a plurality of outlets connected respectively to speech decoder/data expander (SD/DX) units 114-1~114-k. These SD/DX units are periodically activated by channel controller 110 at correct timing to individually receive time-slot signals under control of channel controller 110.

Base station 200 is composed of a space switch 201 which is controlled by a cell-site controller 205 to establish a path on a per-time-slot basis between the TDM input port to which the transmission line 120 is terminated and a plurality of output ports. A plurality of modulators 202-11~202-mn are connected respectively to the output ports of the switch 201, where m is typically 12 to 72 depending on the size of the area (or cell) covered by the base station 200, and n is typically 3. The modulators are connected between the time switch 201 and a diplexer 203 to which the antenna 204 is connected. These modulators are divided into "m" frequency groups of 3 modulators each, and each frequency group is uniquely assigned one of "m" transmit frequencies. The modulators of each group are successively activated by cell-site controller 205 to multiplex three time slots on the assigned frequency.

Demodulators 207-11~207-mn are respectively provided in a one-to-one correspondence to modulators 202-11~202-mn to provide demodulation of TDM signals supplied from transceiver 203. The outputs of demodulators 207-11~207-mn are connected to a bus 208 which is in turn connected to the transmission line 121. In a manner similar to modulators 202, demodulators 202 are divided into "m" frequency groups of 3 demodulators each and the demodulators of each group are activated successively by the same enable signals supplied to the modulators from cell-site controller 205 in order to detect individual time slots. Therefore, the total number of TDM channels available for the base station 200 is equal to "m×n", which is typically in the range 36 to 216. A modulator/demodulator 206 is connected between transceiver 203 and cell-site controller 205 to be used exclusively by the base station 200 for exchanging signaling messages on a control channel with mobile units, not shown. A slot detector 210 is connected to the outputs of alemodulators 207-11~207-mn and activated by timing pulses from cell-site controller 205 to read a signaling message from mobile units and supplies it to the controller 205.

The outputs of demodulators 207-11~207-mn are further connected to a channel quality detector 209, which determines the quality of each output of demodulator 207 and provides the cell-site controller 205 with information identifying the time slot and frequency of a signal whose quality is lower than an acceptable level.

Cell-site controller 205 is connected through a two-way high-speed transmission medium 122 to the channel controller 110 at MTSO 100 to exchange signaling messages. Each of the channel controller 110 and cell-site controller 205 includes a TDM channel (time-slot and frequency) busy/idle status memory and mobile busy/idle status memory which are constantly updated so that the contents of the memories on both sides of the system are identical to each other.

As indicated by numeral 10, the format of the time-slot used in the system is divided into a transmit slot and a receive slot, with the transmit slot consisting of a data slot D1 and a control slot C1 and the receive slot consisting of a data slot D2 and a control slot C2.

At MTSO 100, each SC/DC unit 111 has its input connected to the switch 101, and forms a pair with a corresponding SD/DX unit 114. The SC/DC unit 111 discriminates between a speech signal and a facsimile/computer data signal, and provides conversion of the input to a lower bit-rate signal (11.2-kbps bit stream) if it is a speech signal or provides compression of the input if it is facsimile or computer data and transmits its output on a time slot assigned by the channel controller 110. The SC/DC unit 111 also receives a command signal (such as channel assignment signal) from the controller 110 and transmits it on the control slot C1 of an assigned time slot.

Each SD/DX unit 114 discriminates between a speech signal and a facsimile/computer data signal and provides conversion of the respective input from the space switch 113 to the original bit-rate signal if it is a speech signal or provides expansion of data if it is facsimile or computer data and transmits its output to the PSTN through the switch 101. Channel controller 110 further controls the transmit timing of SD/DX units 114 when forwarding their output signals to the switch 101.

Channel controller 110 is connected to switching controller 102 to exchange call-processing signals when a connection is established in response to a request from the network or from the associated base station, selects one of the SC/DC-SD/DX pairs which are idle and informs the identification of the selected pair to the switching controller 102 to enable it to establish connections in the switch 101 for the duration of a call.

Since all the TDM channels of the base station are not necessarily usable at a given instant of time, depending on the conditions in which the frequencies of the base station interfere with those of adjacent cells or depending on the location of the mobile unit to which a connection is being established, the total number "m×n" is greater than the number "k" of the SC/DC and SD/DX units. Therefore, the time switch 207 has the effect of providing concentration of lines as viewed from the base station, and the time switch 201 provides deconcentration as viewed from the network.

If a second base station is installed, an expansion module 104 identical to module 103 can be installed as an add-on unit in the MTSO 100 so that the capacity of the system can be easily increased.

The operation of the first embodiment of the present invention will be better understood with reference to flowcharts shown in FIGS. 2, 3, 4 and 5 by assuming that an initial connection is established between a four-wire line 105 and a mobile unit by way of SC/DC 111-1 and modulator 202-11 from the network to the mobile unit and by way of demodulator 207-11 and SD/DX unit 114-11 from the mobile unit to the network, and during an intra-cell handoff the routes are switched and new connections are established in the base station 200 by way of modulator 202-12 and demodulator 207-12.

Figure 2:
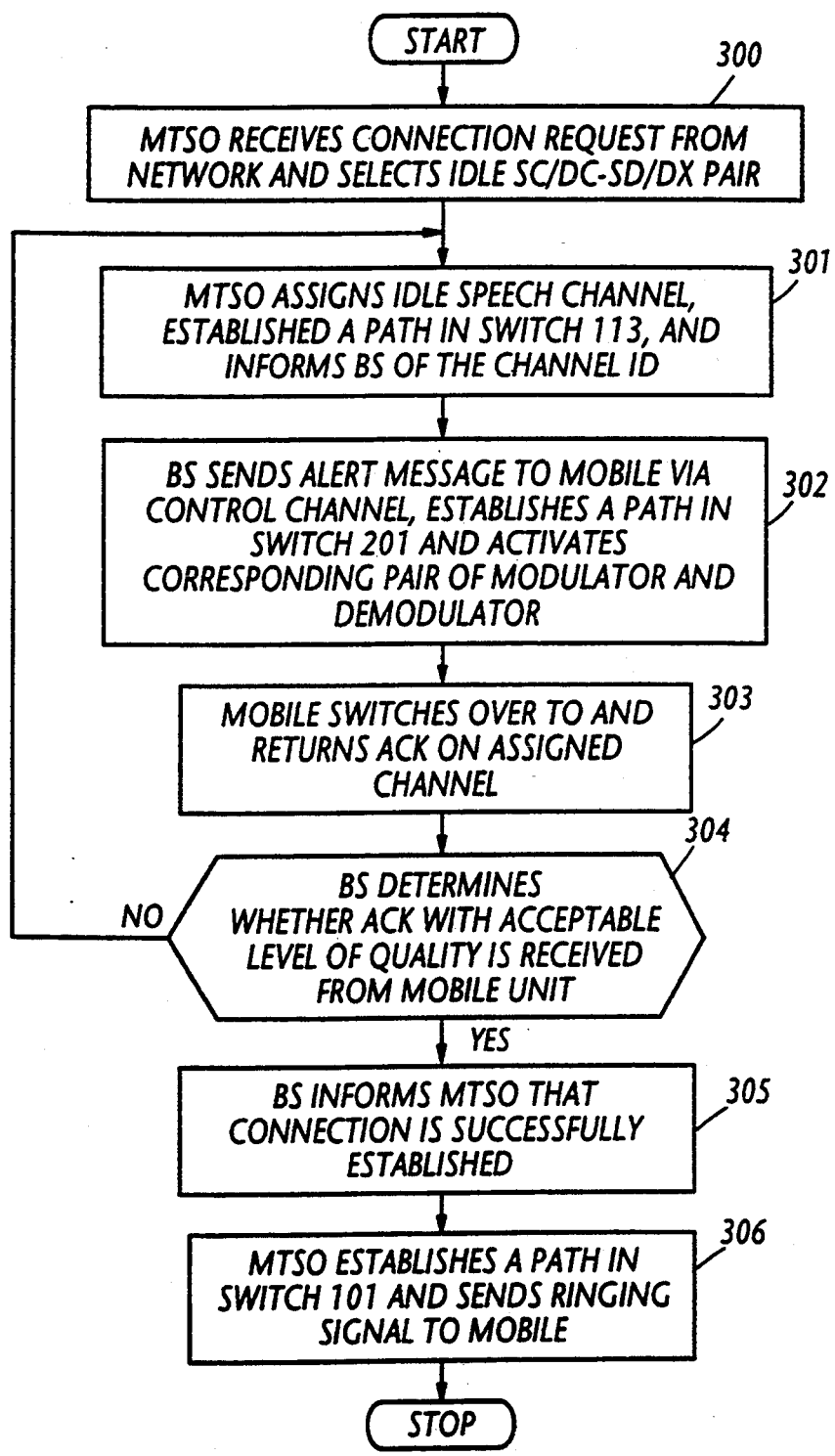
FIG. 2 is a flowchart for describing the process of the system when a call from the network is established.

In FIG. 2, when a connection request is received from the network, switching controller 102 selects a pair of SC/DC unit 111 and SD/DX unit 114, and communicates the identifications of the selected units and the identifier of a destination mobile unit to the channel controller 110 (step 300). In response, channel controller 110 consults the mobile status memory as well as the channel status memory. If the destination mobile unit is determined to be idle, it proceeds to assign a TDM channel by specifying one of "n" (three) time slots and one of "m" frequencies and activates the selected SC/DC and SD/DX units during the assigned time slot interval. Channel controller 110 then establishes a path A2 in switch 113 and transmits a signaling message to the cell-site controller 205, containing the identifications of the time slot and the frequency of the assigned TDM channel and a destination mobile identifier (step 301).

On receiving the signaling message from the MTSO 100, cell-site controller 205 transmits an alert message (containing the speech channel identifier and the identifier of the destination mobile unit) to the destination mobile via the modulator/demodulator 206, while controlling the space switch 201 to establish a path A1 between the transmission line 120 and the input of a modulator 202-ij (e.g, modulator 202-11 in the illustrated embodiment) which corresponds to the assigned channel cell-site controller 205 then activates modulator 202-ij and demodulator 207-ij that at the timing of the assigned time slot (step 302). As a result, a path A3 is established in bus 208 from the output of demodulator 207-ij (i.e., demodulator 207-11 in the illustrated embodiment) to the transmission line 121.

The alert message applied to the modulator-demodulator 206 is transmitted on the control channel and detected by the destination mobile unit if it is constantly monitoring the control channel within the cell of the base station 200. On receiving the alert message, the mobile unit switches its transceiver from the control channel to the assigned speech channel and returns an acknowledgment (ACK) signal containing the mobile's identifier over the established speech channel (step 303).

Cell-site controller 205 is monitoring the outputs of channel quality detector 209 and slot detector 210 to determine whether an ACK signal with an acceptable level of signal quality is received from the destination mobile unit (step 304). If the answer is negative, cell-site controller 205 informs this fact to the channel controller 110. On receiving this information, channel controller 110 assigns a new channel and informs the new channel identifier to the cell-site controller to repeat the above process until the decision at step 304 is affirmative, whereupon the cell-site controller informs the channel controller that a connection is successfully established (step 305). Switching controller 102 is notified by the channel controller of the successful establishment of forward and reverse channels between the base station and the desired mobile unit and establishes a path between four-wire line 105 and SC/DC unit 111-1 and a path between line 105 and SD/DX 114-1 and sends a ringing signal to the mobile unit on the control slot of the established forward channel (step 306).

Figure 3:
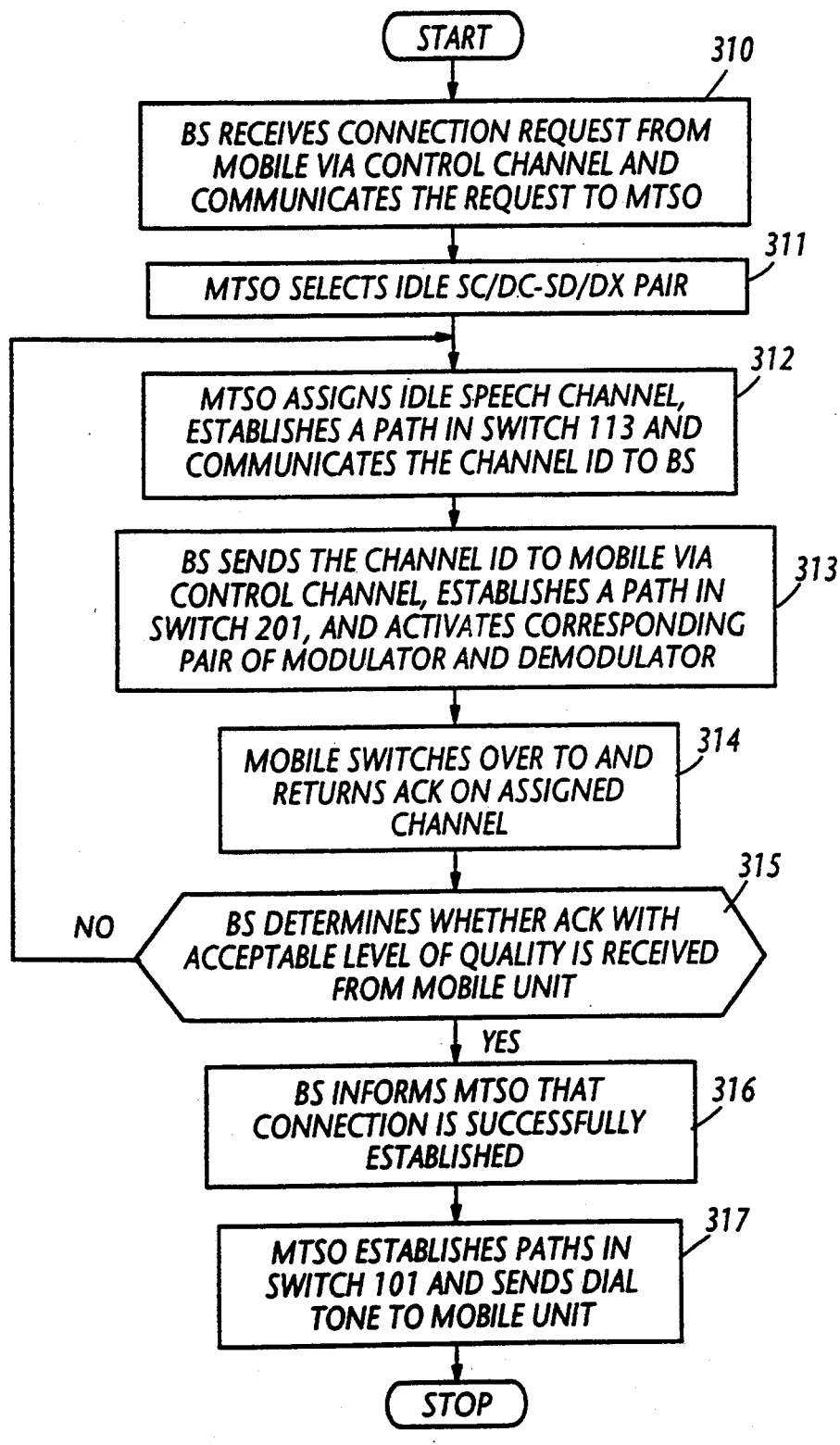
FIG. 3 is a flowchart for describing the process of the system when a call from a mobile unit is established.

In FIG. 3, when a connection request is made from a mobile unit, it is transmitted on the control channel, and cell-site controller 205 receives it via modulator-demodulator 206 and informs this fact to channel controller 110 (step 310). In response, channel controller 110 selects an idle pair of SC/DX and SD/DX units (step 311) and assigns an idle speech channel, establishes a path A2 in switch 113 and communicates the channel identifier to cell-site controller 205 (step 312), which responds to it by transmitting a channel assignment signal over the control channel containing the channel identifier and the identifier of the calling mobile unit, while controlling the switch 201 to establish a path A1, and periodically activating corresponding pair of modulator 202-ij and demodulator 207-ij at the timing of the assigned time slot (step 313).

On receiving the channel assignment signal, the calling mobile unit switches over to the assigned speech channel and returns an ACK signal over the assigned channel (step 314).

In a similar manner to that described above, cell-site controller 205 is monitoring the outputs of channel quality detector 209 and slot detector 210 to determine whether an ACK signal with an acceptable level of signal quality is received from the calling mobile unit (step 315). If the answer is negative, cell-site controller 205 informs this fact to the channel controller 110 to cause it to assign a new channel and receive the new channel identifier by repeating the above process until the decision at step 315 is affirmative, whereupon the cell-site controller informs the MTSO channel controller that a connection is successfully established (step 316). Switching controller 102 is notified by the channel controller of the successful establishment of forward and reverse channels between the base station and the calling mobile unit and establishes a path between four-wire line 105 and SC/DC unit 111-1 and a path between line 105 and SD/DX 114-1 and returns a dial tone over the data slot of the established channel to the calling station (step 317).

During a call the mobile unit is constantly monitoring the quality of the current speech channel in preparation for intra- and inter-cell handoffs and monitoring control channels of surrounding cells for a possible inter-cell handoff during the intervals between successive time slots (channel search mode). At the same time, the quality of established channels is constantly checked by the channel quality detector 209 at the base station. The quality of a signal, as measured in terms of field intensity level or error rate, is affected by interference with adjacent frequencies. Since interference varies with the location of the mobile unit with respect to its surrounding terrain and buildings as well as the frequencies of speech channels used in surrounding cells, the channel quality may vary from time to time when the mobile unit remains stationary.

Figure 4:
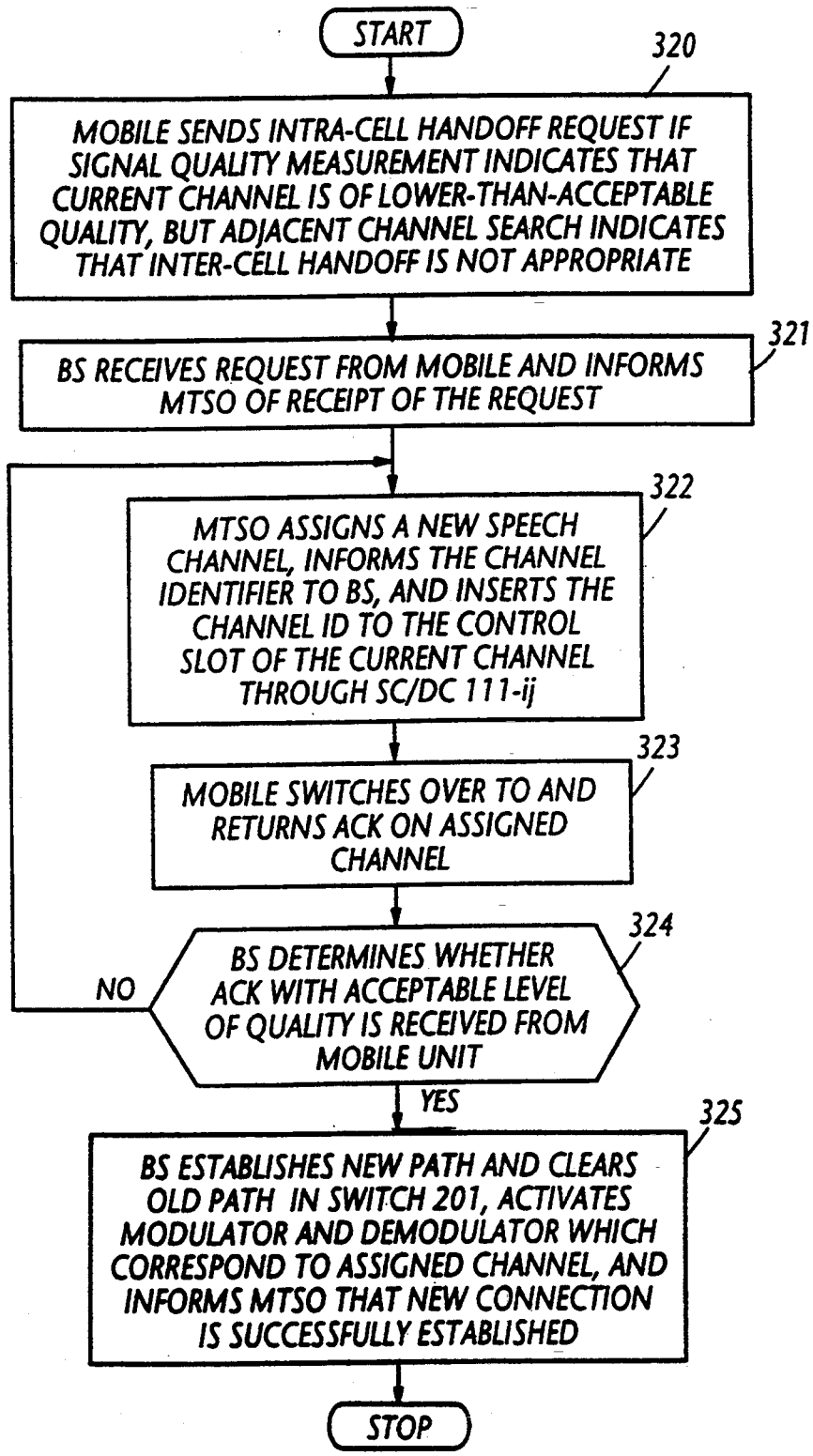
FIG. 4 is a flowchart for describing the process of the system when an intra-cell handoff is effected.

As shown in FIG. 4, the mobile unit sends an intra-cell handoff request signal on the control slot of the current speech channel at step 320 if the signal quality measurement indicates that the quality of the current channel is lower than the acceptable level but the adjacent channel search indicates that inter-cell handoff is not appropriate (i.e., the field intensity of control channels of surrounding cells is lower than the specified level). This request signal is detected by the slot detector 210 and cell-site controller 205 informs the MTSO channel controller of the receipt of a request for an intra-cell handoff (step 321). Channel controller 110 assigns a new channel and communicates the identifier of the assigned channel to the cell-site controller 205 and inserts the channel identifier to the control slot of the currently assigned channel through SC/DC unit 111-1 (step 322) so that the requesting mobile switches over the newly assigned speech channel and returns an ACK signal over the new channel (step 323).

Using the outputs of channel quality detector 209 and slot detector 210, cell-site controller 205 determines whether an ACK signal with an acceptable level of signal quality is received from the mobile unit (step 325). If the answer is negative, cell-site controller 205 informs this fact to the MTSO channel controller to repeat the above process until the decision at step 324 becomes affirmative.

If the quality of the newly assigned speech channel is acceptable, the mobile unit will receive the channel identifier of the reassigned channel and return an ACK, and the cell-site controller will receive it correctly. When this occurs, the decision at step 324 is affirmative, and the cell-site controller establishes a new path B1 in space switch 201 between the transmission line 120 and the input of a modulator 202-12, for example, in accordance with the channel identifier received from the MTSO, clears off the old path A1, and periodically activates the modulator-demodulator pair of the assigned channel at proper timing, and then informs this fact to the MTSO (step 325). As a result, a path B2 is established in bus 208 between the output of demodulator 207-12, instead of path A3. The intra-cell handoff routine comes to the end of execution. It is seen that intra-cell handoff is performed without requiring the MTSO 100 to change connections of the initially selected SC/DC 111-1 and SD/DX units 114-1.

Figure 5:
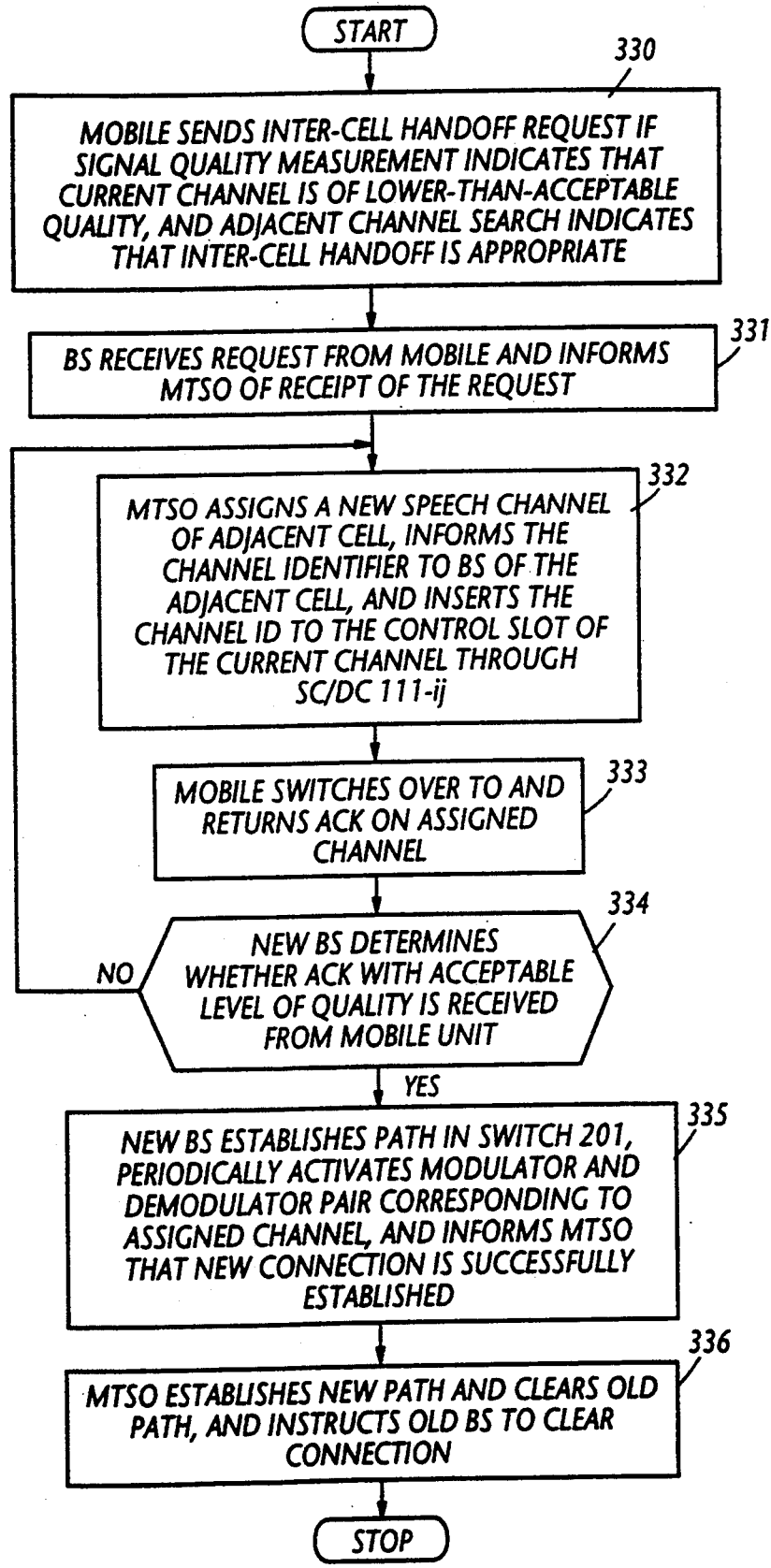
FIG. 5 is a flowchart for describing the process of the system when an inter-cell handoff is effected between adjacent cell sites.

In FIG. 5, the mobile unit sends an inter-cell handoff request signal on the control slot of the current speech channel at step 330 if the signal quality measurement indicates that the quality of the current channel is lower than the acceptable level and the adjacent channel search indicates that inter-cell handoff is appropriate (i.e., the field intensity of control channel of an adjacent cell is higher than the specified level). This request signal is detected by the slot detector 210 and cell-site controller 205 informs the MTSO channel controller of receipt of an inter-cell handoff request (step 331). Channel controller 110 assigns a new channel and communicates the identifier of the new channel to the cell-site controller 205 of an adjacent cell which is identified by the inter-cell handoff request signal from the mobile, and inserts the channel identifier to the control slot of the currently assigned channel through SC/DC unit 111-1 (step 332) so that the requesting mobile switches over the newly assigned speech channel and returns an ACK signal (step 333).

Using the outputs of channel quality detector 209 and slot detector 210, the cell-site controller 205 of the new cell site determines whether an ACK signal with an acceptable level of signal quality is received from the mobile unit (step 334). If the answer is negative, the cell-site controller of the new base station informs this fact to the MTSO channel controller to repeat the above process until the decision at step 334 is affirmative. If the decision at step 334 is affirmative, the new cell-site controller 205 establishes a new path in switch 201 and periodically activates the modulator-demodulator pair of the newly assigned channel, while informing the MTSO channel controller of a successful establishment of the new connection (step 335). The MTSO channel controller responds to this information by establishing a new path in switch 113 of the network termination module associated with the new base station; and clearing old path in switch 113 of network termination module 103 and instructing the old cell-site controller 205 to clear the old connection (step 336).

Figure 6:
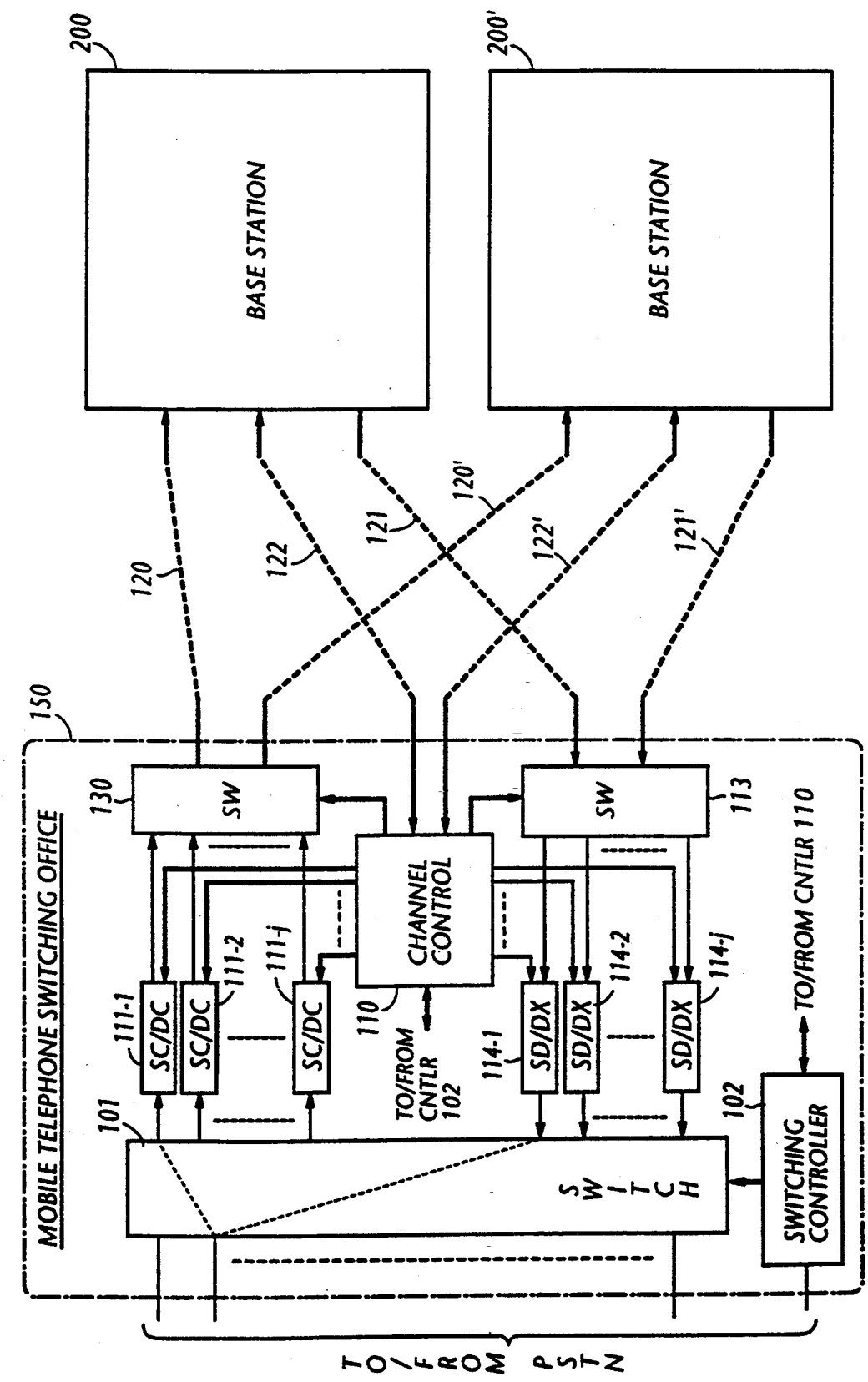
FIG. 6 is a block diagram of a modification of the mobile switching office of the FIG. 3 embodiment.
Figure 7:
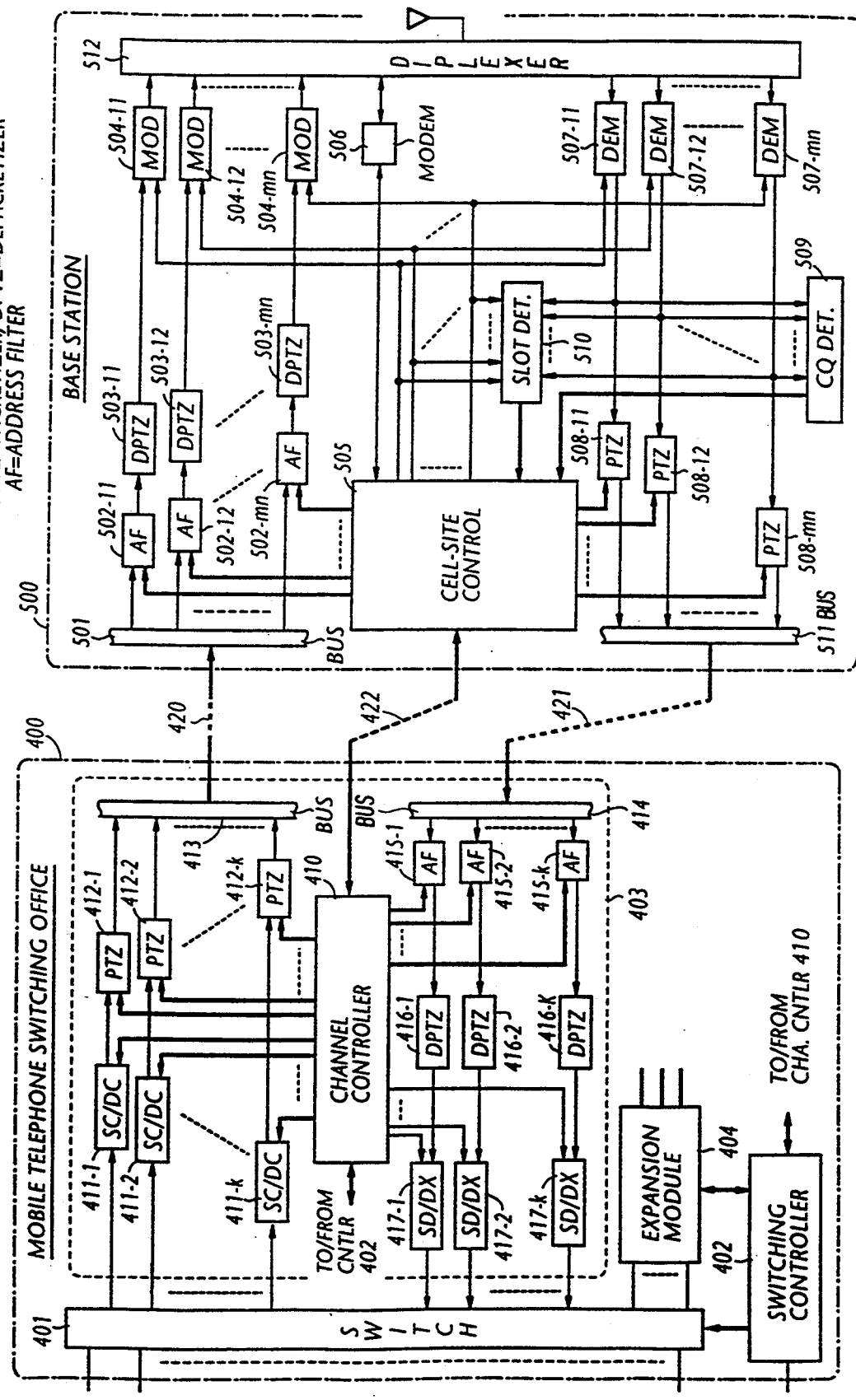
FIG. 7 is a block diagram of another embodiment of the present invention in which address filtering technique is used to effect line concentration and deconcentration.

If two or more base stations 200 and 200' of identical construction are installed simultaneously, it is economical to share common equipments of the MTSO by the base stations. FIG. 6 shows a modified form of the first embodiment of the present invention in which the MTSO, as indicated by numeral 150, differs from FIG. 1 in that it replaces the bus 112 with a switch 130 whose inlets are connected through lines 120, 120' to base stations 200, 200'. Signals sent on transmission lines 121, 121' from base stations 200, 200' are received at the inputs of switch 113. Channel controller 110 is connected by two-way transmission mediums 122 and 122' to base stations 200 and 200' and controls the switches 130 and 113 in accordance with the identification of an assigned TDM channel to provide switching between the terminating lines. SC/DC units 111-1~111-j and SD/DX units 114-1~114-j are provided in an amount corresponding to the combined traffic volume of the base stations.

in the embodiment of FIG. 1, the connections established in the space switches 201 and 208 are maintained for the complete duration of a call in what is known as "circuit-switched mode". An embodiment shown in FIG. 7 is one in which the connections are established in the base station in what is known as "packet-switched mode". According to this modification, MTSO 400 comprises a module 403 consisting of SC/DC units 411-1 through 411-k connected to a switch 401. Packetizers 412-1 through 412-k are connected to receive the respective outputs of SC/DC units 411-1 through 411-k for converting each of these outputs into a packet by appending thereto an address signal supplied from channel controller 410. The outputs of packetizers 412-1~412-k are combined into a multiplexed packet signal on a bus 413 and forwarded onto a transmission line 420. Switch 401 is under control of switching controller 402 to establish paths between the PSTN and the module which is installed in the MTSO 400.

At base station 500 the signal appearing at the end of transmission line 420 is applied through a bus 501 to a plurality of variable address filters 502-11~502-mn. Cell-site controller 505 controls the address of each address filters 502 according to a control message sent from channel controller 410 via two-way transmission line 422. Each address filter 502 allows passage of a packet if there is a match between the address signal contained in it and the address supplied from the cell-site controller 505. The outputs of address filters 502-11~502-mn are applied to depacketizers 503-11~503-mn, respectively, where the address signals are removed and respectively fed into modulators 504-11~504-mn for transmission through diplexer 512.

Demodulators 504-11~504-mn are connected to transceiver 512 to supply their outputs to packetizers 508-11~508-mn, respectively, as well as to channel quality detector 509 and slot detector 510 in a similar manner to the previous embodiments. These modulators and demodulators are periodically activated by cell-site controller 505 in the same manner as described in connection with FIG. 1. Each of the packetizers 508-11~508-mn is supplied with an address signal from cell-site controller 505 to convert the output of the associated demodulator into a packet and forwards it through a bus 511 where it is combined with other packets and transmitted through transmission line 421 to the MTSO 400.

At the MTSO 400 the transmission line 421 is terminated at an input bus 414 where the incoming stream of packet signals is applied to variable address filters 415-11∼415-k. Channel controller 410 controls the address of each of the address filters 415-∼415-k to pass those packets which match the addresses of these filters. The outputs of address filters 415-1∼415-k are applied to depacketizers 416-11∼416-k, respectively, and thence to SD/DX units 417-11∼417-k that are connected to switch 401. Expansion module 404 can be provided if an additional base station is installed.

Both of the channel controller 410 and cell-site controller 505 include an address memory for storing the address signals transmitted with packets. The address signal may contain the identifier of the base station 500 and a number uniquely assigned to each call.

The operation of the system of FIG. 7 is as follows. If a call is originated from either side of the system, connections are established in the MTSO 400 using SC/DC 411-11 and SD/DX 417-11 and in the base station 500 using modulator 504-11 and demodulator 505-11, for example. Channel controller 410 and cell-site controller 505 cooperate with each other in assigning a unique address to that call, storing it into their respective address memory and setting it into packetizers 412-1, 508-11 and address filters 415-1, 502-11. The output signal of SC/DC 411-1 is converted into a packet by packetizer 412-1 where the assigned unique address is inserted into the packet and transmitted through line 420 and detected by address filter 502-11 by address matching. Depacketizer 503-11 removes the address signal from the packet and transmits it through modulator 504-11 to a mobile unit. The signal from the mobile unit appears at the output of demodulator 507-11 and converted to a packet by packetizer 508-11 where it is appended with the same unique address and transmitted through line 421 and detected by address filter 415-1 and applied to depacketizer 416-1 where the address signal is removed and applied to SD/DX 417-1. With this address assignment and filtering arrangement, a signal from any of the "m×n" demodulators units 507 can be switched to any of "k" SD/DX units 417 with a concentration ratio of k/mn and a signal from any of the "k" SC/DC units 411 can be switched to any of "m×n" modulators 504 with a deconcentration ratio of mn/k. When an intra-cell handoff request is received from a mobile unit, channel switching can be easily effected within the base station 500 by executing steps 320 to 324 of the flowchart of FIG. 4 to assign a new channel, executing step 325 to determine a new unique address, setting it into the address filter 502 and packetizer 508 of the newly assigned channel, while resetting the address filter 502 and packetizer 508 of the previous channel and informing the new unique address to the channel controller 410 to allow it to effect the same changes in the MTS0 400. The procedures involved with an inter-cell handoff are similar to those described in connection with the flowchart of FIG. 5 with the exception that following execution of steps 330 to 334 to assign a new channel, the MTSO and new base station cooperate to assign a new unique address to the handoff at step 335, and sets it into the packetizers 412, 508 and address filters 415, 502 of the new channel, and the MTSO and the old base station cooperate to reset the packetizers 412, 508 and address filters 415, 502 of the old channel.

Figure 8:
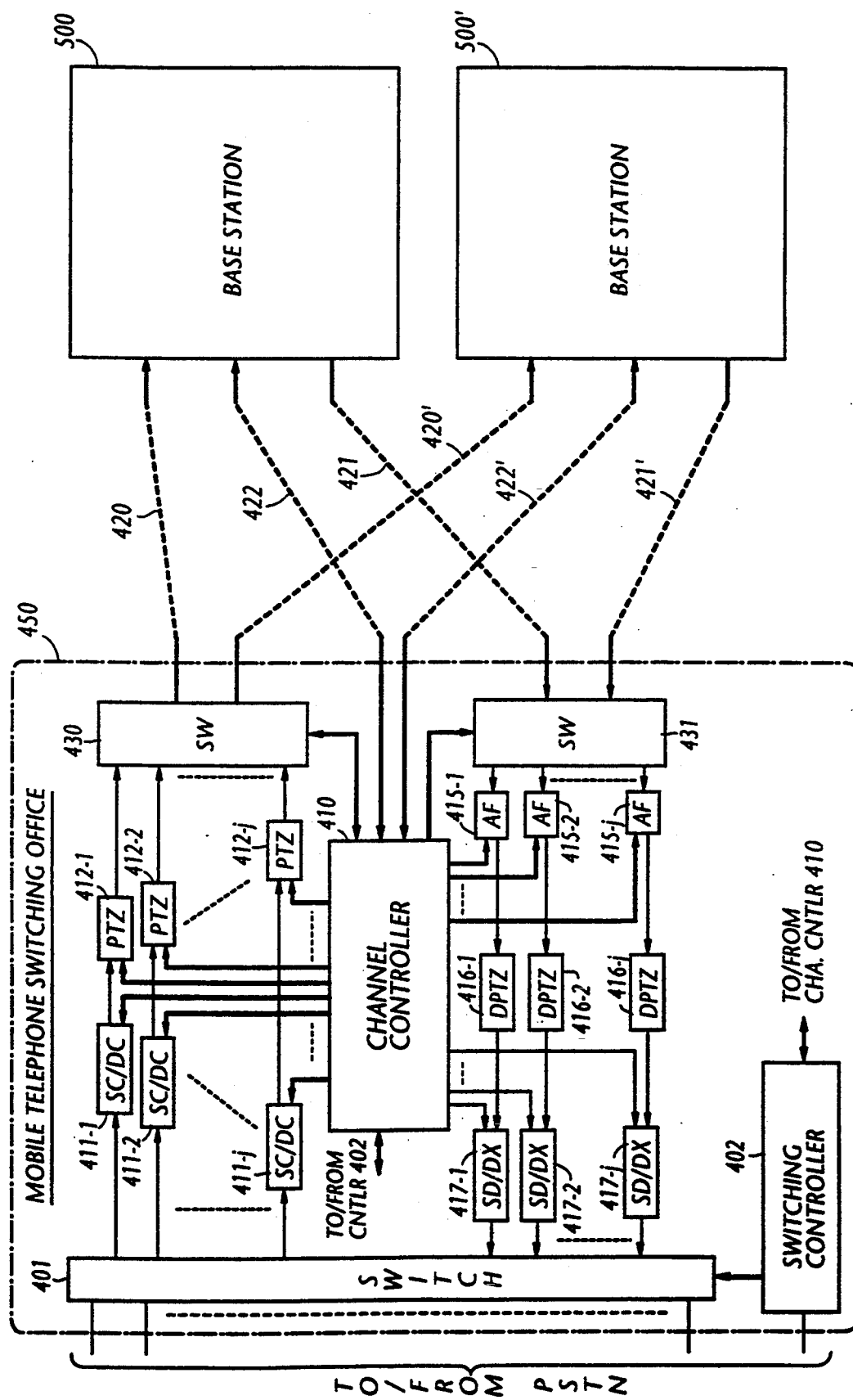
FIG. 8 is a block diagram of a modified form of the embodiment of FIG. 7.

FIG. 8 shows a modification of the MTSO of FIG. 7. As indicated by numeral 450, the MTSO serves two base stations 500 and 500' of identical configuration. In this modification, the bus systems 413 and 414 are replaced with switches 430 and 431, respectively, which are connected to transmission lines so that lines 420, 420' extend from the outputs of switch 430 to base stations 500 and 500' and lines 421, 421' from base stations 500, 500' are terminated at the inputs of switch 431. Channel controller 410 is connected by two-way transmission mediums 422 and 422' to base stations 500 and 500' and controls the switches 430 and 431 in accordance with the identification of an assigned TDM channel to provide switching between the terminating lines. SC/DC units 411-1∼411-j, packetizers 412-1∼412-j, address filters 415-1∼415-j, depacketizers 416-1∼416-J, and SD/DX units 417-1∼417-j are provided in an amount corresponding to the combined traffic volume of the base stations.

Figure 9:
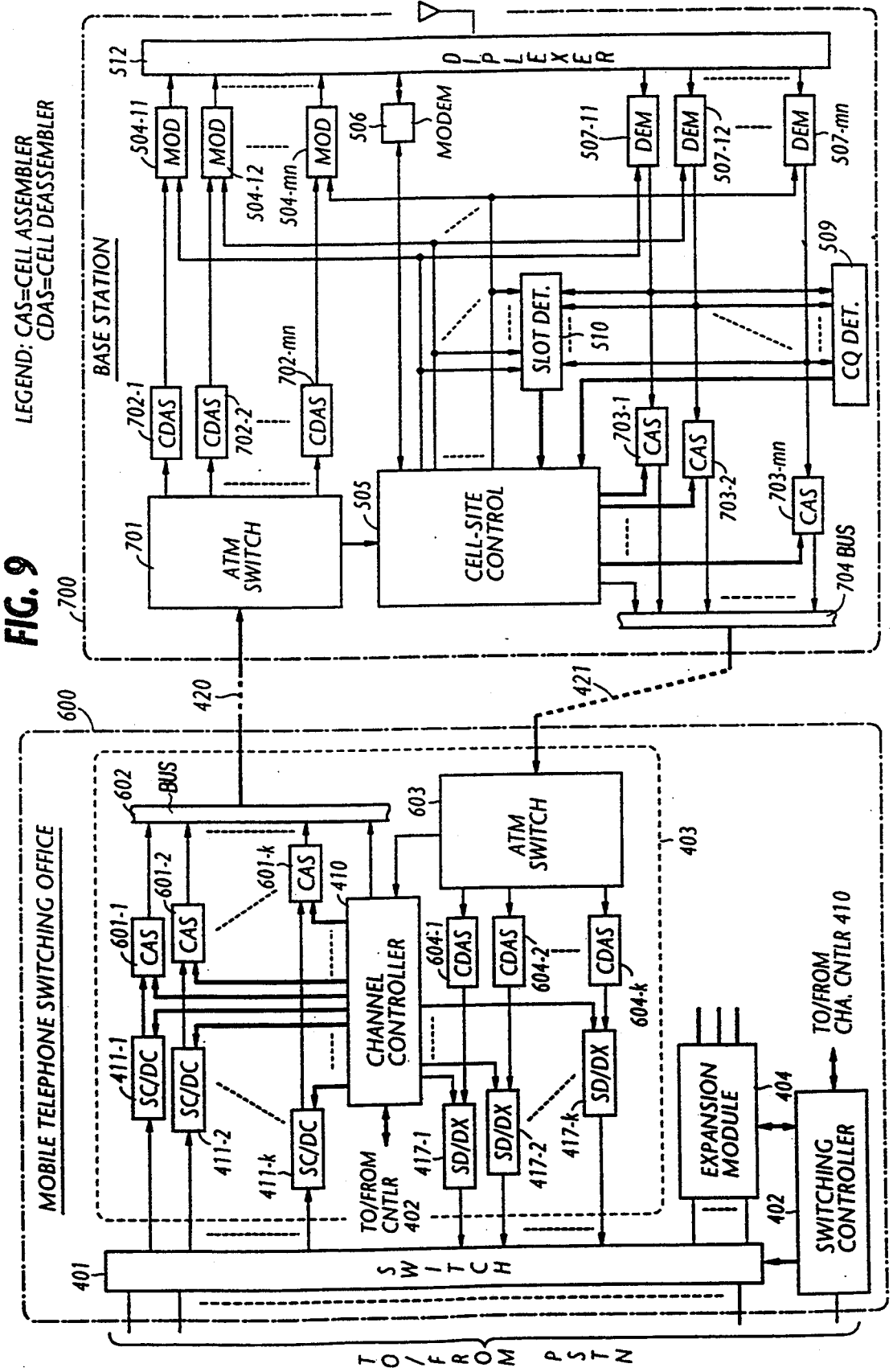
FIG. 9 is a block diagram of a further embodiment of the present invention in which address filtering and ATM (asynchronous transfer mode) switching techniques are combined to effect line concentration and deconcentration.

The embodiment of FIG. 7 is further modified as shown in FIG. 9 by incorporating ATM (asynchronous transfer mode) switches 603 and 701 installed respectively in MTSO 600 and base station 700, and using elements indicated by numerals 601, 602, 604 at MTSO and elements indicated by numerals 702, 703 and 704 at base station 700. As illustrated, the outputs of SC/DC units 411-1∼411-k are connected respectively to cell assemblers 601-1∼601-k where the signals from the associated SC/DC units are converted to "cells" of the 53-byte ATM format in which the cell header contains a "routing tag". According to this embodiment, the routing tag contains the identifier of base station 700 and a serial number so that the tag uniquely identifies a connection. A routing tag is generated by channel controller 410 according to the busy/idle status of TDM channels and inserted through one of the cell assemblers 601 into the header of each cell forwarded therefrom. The outputs of all cell assemblers 601 are connected to a bus 602 to which channel controller 410 applies a signaling message in the ATM cell format. The outputs of all cell assemblers 601 and channel controller 410 are combined into a multiplex signal and transmitted through high-speed line 420 to he input of ATM switch 701.

Since the ATM switch has the basic functions of routing, queuing and header translation, ATM switch 701 translates the routing tag of each incoming cell by using a translation table in which relationships between all possible routing tags and internal cell addresses are mapped. Following a header translation, ATM switch 701 examines the header of each incoming cell and routes it to one of cell deassemblers 702-1∼702-mn if it is a speech/data cell or routes it to cell-site controller 505 if it is a signaling cell from channel controller 410. The signals supplied to cell deassemblers 702 are deassembled and respectively applied to modulators 504-11∼504-mn for transmission in sequence.

The outputs of demodulators 507-31∼507-mn are coupled to cell assemblers 703-1∼703-mn, respectively, Cell-site controller 505 generates the same routing tag as produced by channel controller 410 according to the signaling message received via ATM switch 701 and inserts it through one of cell assemblers 703 into cell headers. A signaling message in the ATM cell format is supplied from cell-site controller 505 to a bus 704 to which the outputs of cell assemblers 703 are terminated.

The combined output signal from bus 704 is transmitted through high-speed line 421 to ATM switch 603 where the individual cells are routed to cell deassemblers 604-1~604-k if the cell is a speech/data signal or applied to channel controller 410 if it is a signaling message. The outputs of the cell deassemblers 604 are coupled respectively to SD/DX units 417.

Figure 10:
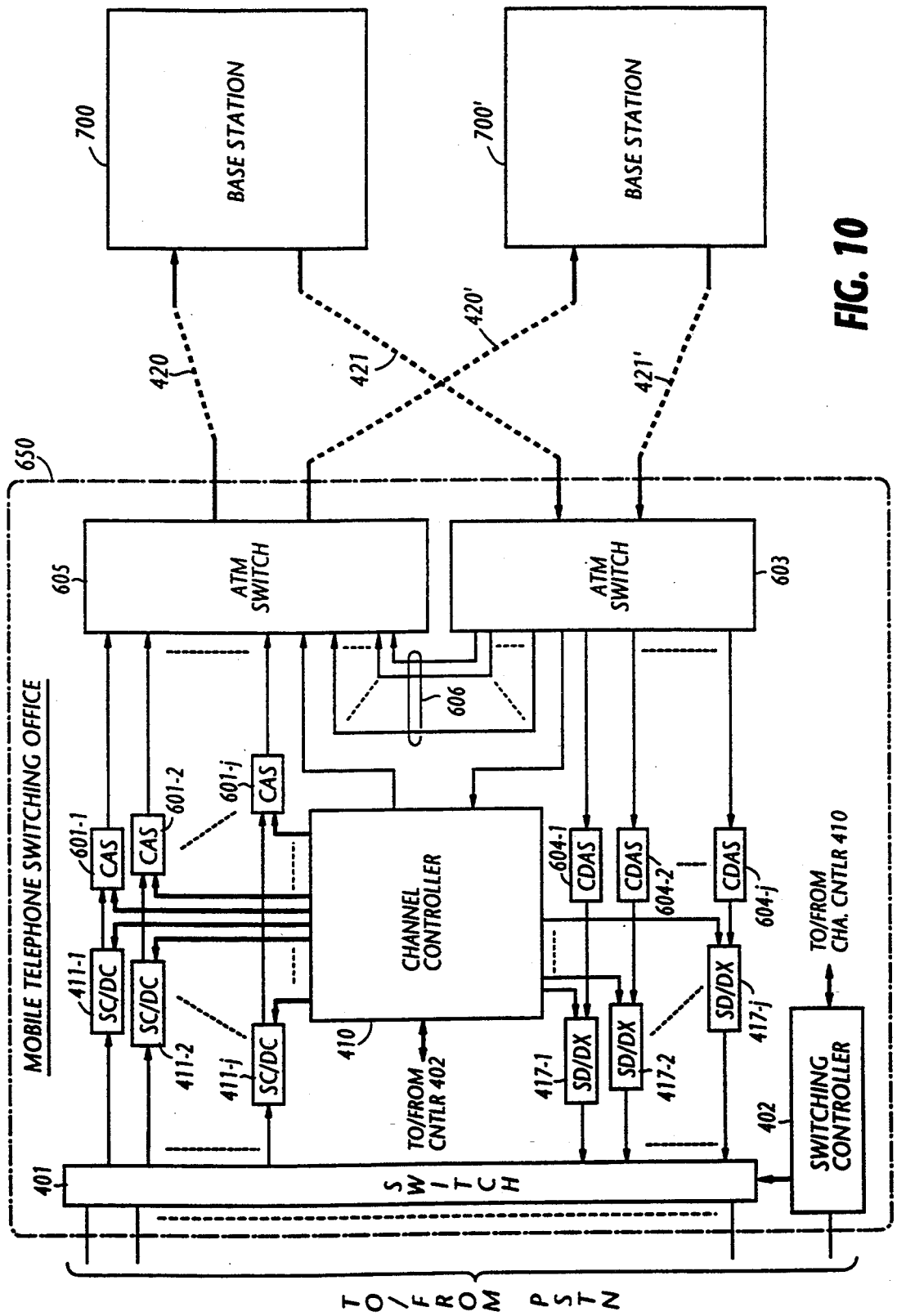
FIG. 10 is a block diagram of a modification of the embodiment of FIG. 9.

If the MTSO were to serve more than one base station, the MTSO of embodiment of FIG. 9 can be advantageously modified as shown in FIG. 10. In this modification, the MT50, as indicated at 650, includes an ATM switch 605 which is used instead of the bus 602 of FIG. 9 to provide routing of cells from cell assemblers 601 and channel controller 410 to one of base stations 700 and 700' via transmission lines 420 and 420'. Signals on transmission lines 421 and 421' from base stations 700 and 700' are terminated at respective inputs of ATM switch 603. A certain number of outlets of ATM switch 603 are connected by lines 606 to a corresponding number of inlets of ATM switch 605. In this way, connection requests from base station 700 can be established through line 421, ATM switch 603, lines 606, ATM switch 605 and line 420' to base station 700', and connection requests from base station 700' can be established through line 421', ATM switch 603 lines 606, ATM switch 605 and line 420 to base station 700, thus eliminating the need to pass through the SC/DC and SD/DX units of the MTSO 650.

In addition, the ATM switch 605 is designed to have the ability to produce a copy of an incoming ATM cell from any of the cell assemblers 601, and send it via one of the transmission lines 420 and 420'. This copying ability is advantageously used when effecting an inter-cell handoff between base stations 700 and 700'. For example, if a connection is established between the network and base station 700 through line 720, channel controller 410 responds to an inter-cell handoff request from base station 700 by instructing ATM switch 605 to produce a copy of the ATM cells which are directed to base station 700 and applies it over line 420' to base station 700'. Therefore, the ATM cells are transmitted simultaneously to both base stations during handoff period. This ensures continuity of connection during handoff.

An embodiment shown in FIG. 11 is one that can be advantageously employed for minimizing possible changes which occur as a result of the public switched network evolving from the current switching technology to the future ATM switching. According to this embodiment, MTSO 800 includes a multiplexer/demultiplexer (MUX/DEMUX) 801, which interfaces the public switched network, or ISDN (integrated services digital network). Cell assemblers 802 and cell deassemblers 812 are connected to MUX/DEMUX 801. These cell assemblers and deassemblers are not permanent installations of the TDMA cellular system, but will be used until the network periphery is cut over to an ATM switching office. Until then the signals from the network are converted to ATM cells at the entry of the MTSO under control of channel controller 806 and applied to an ATM switch 803 where they are routed to a plurality of SC/DC units 804 where the signal contained in the information field of the cell is processed for lower bit rate conversion. The outputs of SC/DC units 804 and the signaling message from channel controller 806 are routed by an ATM switch 805 to base station 700 or 700' via transmission lines 420, 420'. Signals carried on transmission lines 421 and 421' from base stations 700, 700' are fed into an ATM switch 809 and routed to SD/DX units 810 or channel controller 806 depending on the cell contents of their information fields. The outputs of SD/DX units 810 are routed by an ATM switch 811 to cell deassemblers 812.

Similar to the embodiment of FIG. 10, ATM switches 805 and 809 are connected by lines 813 to permit establishment of connections between base stations 700 and 700' during handoff. Additionally, ATM switch 805 has the ability to produce a copy of incoming ATM cells for transmission to an adjacent base station simultaneously with the transmission of the original ATM cells to the base station from which an inter-cell handoff request is issued.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A cellular mobile communication system comprising:
   a mobile switching center comprising:
      a plurality of high-to-low bit rate converters for providing high to low bit rate conversion on signals from a switched network to produce low bit rate signals;
      multiplexer means for composing said low bit rate signals from the high-to-low bit rate converters into a multiplex of low bit rate signals and transmitting the multiplex of low bit rate signals over a first transmission medium;
      demultiplexer means for decomposing a multiplex of low bit rate signals from a second transmission medium into low bit rate component signals;
      a plurality of low-to-high bit rate converters for respectively providing low to high bit rate conversion on the low bit rate component signals from the demultiplexer means and supplying high bit rate signals to the switched network; and
      a controller for receiving a call request from the network; and
   a base station comprising:
      a controller for receiving a call request from mobile units, the controllers of the mobile switching center and the base station cooperating with each other in response to each of the respectively received call requests to produce a first channel assignment signal and transmitting the first channel assignment signal to a said mobile unit;
      a plurality of modulators for establishing a plurality of forward channels;
      demultiplexer means for decomposing the multiplex of said low bit rate signals from said first transmission medium into low bit rate component signals and applying the low bit rate component signals to said modulators according to said first channel assignment signal;
      a plurality of demodulators for establishing a plurality of reverse channels; and
      multiplexer means for transmitting outputs of said demodulators as said multiplex of low bit rate signals over said second transmission medium to the mobile switching center,
      the controller of the base station being responsive to an intra-cell handoff request from the said mobile unit for cooperating with the controller of the mobile switching center to produce a second channel assignment signal and applying the second channel assignment signal to said demultiplexer means of the base station to cause a said low bit rate component signal from said first transmission medium to be applied to another one of said modulators, and transmitting said second channel assignment signal to the said mobile unit.

2. A cellular mobile communication system as claimed in claim 1, wherein each of said mobile units returns an acknowledgement signal to said base station in response to each of said first and second channel assignment signals, wherein the controller of said base station further comprises means responsive to said acknowledgement signal and transmitting a request to the controller of said mobile switching center indicating that the quality of an assigned channel is below an acceptable level, and wherein the controller of the mobile switching center responds to the last-named request for further cooperating with the controller of the base station to assign a new channel and produce a further channel assignment signal.

3. A cellular mobile communication system as claimed in claim 1, wherein said demultiplexer means of the mobile switching center comprises a switch responsive to each of said first and second channel assignment signals for coupling the decomposed low bit rate component signals from the second transmission medium to said low-to-high bit rate converters, and wherein said demultiplexer means of the base station comprises a switch responsive to each of said first and second channel assignment signals for coupling low bit rate signals from the first transmission medium to said modulators.

4. A cellular mobile communication system as claimed in claim 1, further comprising a second base station to which the mobile switching center is connected via third and fourth transmission mediums, wherein said multiplexer means of the mobile switching center comprises a switch responsive to each of said first and second channel assignment signals for coupling the low bit rate signals from said high-to-low bit rate converters to one of said first and third transmission mediums, and said demultiplexer means of the mobile switching center comprises a switch responsive to each of said first and second channel assignment signals for coupling low bit rate signals from said second and fourth transmission mediums to said low-to-high bit rate converters.

5. A cellular mobile communication system as claimed in claim 1, wherein the multiplexer means of said mobile switching center comprises:
a plurality of packetizers connected between said high-to-low bit rate converters and said multiplexer means for packetizing the low bit rate signals into packet signals each containing a unique address corresponding to each of said first and second channel assignment signals and causing said multiplexer means to transmit a multiplex of the packet signals to said first transmission medium,
wherein the demultiplex means of the mobile switching center comprises:
a plurality of address filters for receiving a multiplex of packet signals from said second transmission medium, each of the address filters being responsive to each of the first and second channel assignment signals for setting a unique address for passing a packet signal having a unique address equal to the unique address set in the address filter; and
a plurality of depacketizers for depacketizing the packet signals from the address filters and applying the depacketized signals to said low-to-high bit rate converters,
wherein the demultiplexer means of said base station comprises:
a plurality of address filters for receiving said multiplex of the packet signals from the first transmission medium, each of said address filters being responsive to the each of said first and second channel assignment signals for setting a unique address for passing a packet signal having a unique address equal to the unique address of the address filter; and
a plurality of depacketizers depacketizing the packet signals from said address filters and the base station and applying the depacketized signals to said modulators, and
wherein the multiplex means of the base station comprises:
a plurality of packetizers for packetizing the outputs of said demodulators into packet signals each containing a unique address corresponding to each of said first and second channel assignment signal, and transmitting a multiplex of the packet signals to said second transmission medium.

6. A cellular mobile communication system as claimed in claim 1, further comprising a second base station to which the mobile switching center is connected via third and fourth transmission mediums, wherein said multiplexer means of the mobile switching center comprises a switch responsive to each of said first and second channel assignment signals for coupling the packet signals from said packetizers of the mobile switching center to one of said first and third transmission mediums, and said demultiplexer means of the mobile switching center comprises a switch responsive to each of said first and second channel assignment signals for coupling low bit rate signals from said second and fourth transmission mediums to said address filters of the mobile switching center.

7. A cellular mobile communication system as claimed in claim 1, wherein the multiplexer means of said mobile switching center comprises:
a plurality of cell assemblers connected between said high-to-low bit rate converters and said multiplexer means for assembling the low bit rate signals into ATM (asynchronous transfer mode) cells each containing a unique address corresponding to each of said first and second channel assignment signals and causing said multiplexer means to transmit a multiplex of the ATM cells to said first transmission medium;
wherein the demultiplexer means of the mobile switching center comprises:
an ATM switch for receiving a multiplex of ATM cells from said second transmission medium and routing a said ATM cell to one of a plurality of outlets of the ATM switch according to the unique address contained in the said ATM cell; and
a plurality of cell deassemblers connected to the outlets of the ATM switch for deassembling the ATM cells and applying the deassembled ATM cells to said low-to-high bit rate converters, wherein the demultiplexer means of said base station comprises:

an ATM switch for receiving a multiplex of ATM cells from said first transmission medium and routing a said ATM cell to one of a plurality of outlets of the ATM switch according to the unique address contained in the said ATM cell; and a plurality of cell deassemblers connected to the outlets of the ATM switch of the base station for deassembling the ATM cells and applying the deassembled ATM cells to said modulators, wherein the multiplexer means of the base station comprises:

a plurality of cell assemblers for assembling the output signals of said demodulators into ATM cells containing a unique address corresponding to each of said first and second channel assignment signal, and transmitting a multiplex of the ATM cells to said second transmission medium.

8. A cellular mobile communication system as claimed in claim 7, further comprising a second base station to which the mobile switching center is connected via third and fourth transmission mediums, wherein the multiplexer means of said mobile switching center further comprises a first ATM switch for receiving the ATM cells from said cell assemblers of the mobile switching center and routing a said ATM cell according to the unique address contained therein to one of said first and third transmission mediums and wherein the demultiplexer means of the mobile switching center further comprises a second ATM switch for receiving ATM cells from said second and fourth transmission mediums and routing a said ATM cell according to the unique address contained therein to the cell deassemblers of the mobile switching center.

9. A cellular mobile communication system as claimed in claim 8, further comprising means for coupling the controller of the mobile switching center to an inlet of said first ATM switch for transmitting a signaling message to the base station and to an outlet of the second ATM switch for receiving a signaling message from the base station.

10. A cellular mobile communication system as claimed in claim 8, further comprising means for establishing a connection between an outlet of the second ATM switch to an inlet of the first ATM switch.

11. A cellular mobile communication system as claimed in claim 8, wherein said first ATM has the ability to produce a copy of ATM cells from the cell assemblers of the mobile switching center and routing said copy to one of the first and third transmission mediums.

12. A cellular mobile communication system as claimed in claim 1, further comprising:

a plurality of cell assemblers for assembling signals from said network into ATM (asynchronous transfer mode) cells each containing a routing tag corresponding to each of said first and second channel assignment signals;

a first ATM switch for routing the ATM cells from the cell assemblers to one of a plurality of outlets of the first ATM switch according to the routing tags contained therein, said outlets being connected respectively to said high-to-low bit rate converters;

a second ATM switch connected to said low-to-high bit rate converters for routing ATM cells therefrom to one of a plurality of outlets of the second ATM switch according to the routing tags contained therein;

a plurality of cell deassemblers connected respectively to the outlets of the second ATM switch for deassembling the ATM cells therefrom and applying the deassembled ATM cells to said network.

13. A cellular mobile communication system as claimed in claim 12, further comprising a second base station to which the mobile switching center is connected via third and fourth transmission mediums, wherein said multiplexer means of the mobile switching center comprises a third ATM switch for routing output signals of the high-to-low bit rate converters to one of said first and third transmission mediums according to routing tags contained therein, and said demultiplexer of the mobile switching center comprises a fourth ATM switch connected between said second and fourth transmission mediums and said low-to-high bit rate converters for routing signals from the second and fourth transmission mediums to said low-to-high bit rate converters according to routing tags contained therein.

14. A cellular mobile communication system as claimed in claim 13, further comprising means for connecting the controller of the mobile switching center to an inlet of the third ATM switch for transmitting a signaling message to the base station and to an outlet of the fourth ATM switch for receiving a signaling message from the base station.

15. A cellular mobile communication system as claimed in claim 13, further comprising means for connecting an outlet of the fourth ATM switch to an inlet of the third ATM switch.

* * * * *

UNITED STATES PATENT AND TRADEMARK OFFICE
CERTIFICATE OF CORRECTION

PATENT NO.   : 5,420,863
DATED        : May 30, 1995
INVENTOR(S)  : Masanori Takesugu and Yukitsuna Furuya It is certified that errors appears in the above-identified patent and that said Letters Patent is hereby corrected as shown below:

Col. 3, line 61, delete "alemodulators", insert --demodulators--.

Col. 5, line 34, delete "that".

Col. 8, line 26, delete "in".

Col. 10, line 60, delete "31".

Col. 11, line 11, delete "MT50".

Signed and Sealed this

Tenth Day of October, 1995

Attest:

BRUCE LEHMAN

*Attesting Officer*        *Commissioner of Patents and Trademarks*